United States Patent [19]

Rasch et al.

[11] Patent Number: 4,898,903

[45] Date of Patent: Feb. 6, 1990

[54] THERMALLY STABLE FLUORINATED ORGANOSILOXANE GEL COMPOSITION

[75] Inventors: Diane M. Rasch, Alameda, Calif.; Lawrence D. Fiedler, Midland, Mich.

[73] Assignee: Dow Corning Corporation, Midland, Mich.

[21] Appl. No.: 322,865

[22] Filed: Mar. 14, 1989

[51] Int. Cl.$^4$ .................................................. C08K 5/04
[52] U.S. Cl. .................................... 524/398; 524/394; 524/397
[58] Field of Search ........................ 524/398, 394, 397

[56] References Cited

U.S. PATENT DOCUMENTS

| 4,122,246 | 10/1978 | Sierawski | 528/15 |
| 4,528,313 | 7/1985 | Swihart et al. | 524/397 |
| 4,686,271 | 8/1987 | Beck et al. | 525/478 |
| 4,719,275 | 1/1988 | Benditt et al. | 528/15 |

OTHER PUBLICATIONS

Article: Rafikov et al., Proceedings of Academy of Sci. of USSR, vol. 171, No. 6 p. 1352(1966).

Primary Examiner—Melvyn I. Marquis
Attorney, Agent, or Firm—Robert Spector

[57] ABSTRACT

Polyorganosiloxane gels exhibiting a resistance to discoloration, hardening and surface deformation at temperatures of 100° C. and above can be prepared by curing compositions comprising a polydiorganosiloxane containing silicon bonded fluorinated hydrocarbon radicals and an organohydrogensiloxane containing at least three silicon bonded hydrogen atoms per molecule in the presence of a platinum containing catalyst and up to 0.1 percent, based on the weight of said composition, of copper acetylacetonate.

7 Claims, No Drawings

THERMALLY STABLE FLUORINATED ORGANOSILOXANE GEL COMPOSITION

BACKGROUND OF THE INVENTION

1. Field of the Invention

This invention relates to curable polyorganosiloxane compositions. More particularly, this invention relates to improved fluorinated polyorganosiloxane compositions that cure by a hydrosilation reaction to yield gels exhibiting a resistance to hardening when heated.

2. Description of the Prior Art

The term "polyorganosiloxane gel" typically defines a class of elastomeric, readily deformable materials exhibiting a surface hardness of below about 20 on the Shore 00 durometer scale. The hardness value of many gels is too low to be measured on this scale, and is often expressed as the depth to which a penetrometer probe of specified dimensions will penetrate or deflect the surface of the gel under a specified loading.

U.S. Pat. No. 4,719,275, which issued to K. Benditt and M. Maxson on Jan. 12, 1988 is directed to organosiloxane compositions that cure to yield a clear, thermally stable fluorosilicone gel. The compositions comprise (1) a liquid diorganovinylsiloxy terminated polydiorganosiloxane wherein at least 25 percent of the silicon atoms are bonded to a fluorine-containing hydrocarbon radical (2) a compatible liquid fluorine-containing organohydrogensiloxane having an average of more than two silicon bonded hydrogen atoms per molecule in an amount sufficient to provide a molar ratio of silicon bonded hydrogen atoms to vinyl radicals in said composition of from 0.5 to about 1.0; and (3) an amount of a platinum-containing catalyst sufficient to promote curing of said composition.

The polydiorganosiloxane referred to as ingredient (1) is prepared by the ammonia-catalyzed polymerization of at least one cyclic diorganosiloxane followed by reaction of the resultant liquid silanol terminated polydiorganosiloxane with at least a stoichiometric amount of a hexaorganodisilazane wherein a vinyl radical is bonded to each of the two silicon atoms.

The unique physical and chemical properties of the polyorganosiloxane gels disclosed in the aforementioned patent to Benditt and Maxson make them desirable as coatings and encapsulants for electrical and electronic devices to protect these devices from moisture, other contaminants and mechanical abuse, all of which can cause the device to malfunction or become inoperative.

Electronic components associated with electronic ignition and emission control systems of automobiles and other vehicles powered by internal combustion engines are often located in the engine compartment of the vehicle where they are exposed to temperatures of 100° C. and above in addition to hydrocarbon fuels and lubricating fluids. Many prior art polyorganosiloxane gels harden or soften to the extent that they no longer provide the desired protection.

U.S. Pat. No. 4,122,246, which issued to Sierawski on Oct. 24, 1978, teaches preventing the discoloration of gels during aging. The composition for preparing the gel contains (1) a polyorganosiloxane containing an average of about two vinyl radicals per molecule and an average of from 2 to 2.03 hydrocarbon or fluoroalkyl radicals per silicon atom; (2) an organosilicon compound having an average of at least 3 silicon-bonded hydrogen atoms per molecule; (3) a polysiloxane having at least one silicon-bonded hydroxyl radical per molecule, at least two silicon-bonded vinyl radicals per molecule, and an average of less than 15 silicon atoms per molecule; and (4) a silane having at least one silicon-bonded epoxy-substituted hydrocarbon radical, at least one silicon-bonded alkoxy group having less than 5 carbon atoms per group; and (5) a platinum catalyst. The combined weights of ingredients (3) and (4) are less than 1.5 weight percent of the composition and the molar ratio of silicon bonded hydrogen atoms in (2) to vinyl radicals in (1) is less than 1. To achieve the desired resistance to discoloration ingredients (1), (3), and (4) must be combined before being blended with the remaining ingredients of the composition.

The gel obtained by curing the composition disclosed in the aforementioned Sierawski patent exhibits a penetration of from 2 to 60 millimeters measured using a Precision Universal Penetrometer.

Following the teaching of Sierawski to prepare a gel that is resistant to discoloration upon aging is less than desirable because of the two additional ingredients required, which increases the cost of the curable composition. In addition Sierawski does not address the problem of hardening and surface deformation observed when the fluorinated polyorganosiloxane gels disclosed in the aforementioned Benditt and Maxson patent are heated at temperatures of 100° C. and above.

The use of dibutyltitanium acetylacetonate and ferric acetylacetonate as heat stabilizers for polydimethylsiloxane is taught in an article by Rafikov et al. that appeared in the Proceedings of the Academy of Sciences of the USSR [Volume 171, No. 6, page 1352 (1966)]. Decomposition of the polymer to hydrogen, methane and ethane was inhibited.

U.S. Pat. No. 4,528,313, which issued to T. Swihart and J. Jones on July 9, 1985 teaches using mixtures of iron acetylacetonate, nickel acetylacetonate and cerium acetylacetonate to impart thermal oxidative stability and increase the gelation time of a trimethylsiloxy-terminated polydimethylsiloxane fluid that is useful as a high temperature lubricant. The compositions optionally include a carboxylic acid containing from 2 to 9 carbon atoms.

One objective of this invention is to provide improved fluorine containing polyorganosiloxane compositions that upon curing yield gels exhibiting a resistance to discoloration, hardening and surface deformation when heated, and to do so without requiring reactants other than a vinyl containing polyorganosiloxane, an organohydrogensiloxane and a curing catalyst.

SUMMARY OF THE INVENTION

It has now been found that polyorganosiloxane gels exhibiting a resistance to discoloration, hardening and surface deformation at temperatures of 100° C. and above are obtained by curing compositions comprising a polydiorganosiloxane containing silicon bonded fluorinated hydrocarbon radicals, an organohydrogensiloxane containing at least three silicon bonded hydrogen atoms per molecule and a platinum-containing catalyst when up to 0.1 percent, based on the weight of said composition, of copper acetylacetonate is present in the curable composition.

In preferred embodiments the polydiorganosiloxane is prepared by the ammonia catalyzed polymerization of at least one cyclic fluorine-containing diorganosiloxane followed by reaction of the resultant silanol terminated polymer with a hexaorganodisilazane containing a vinyl radical bonded to each of the two silicon atoms.

DETAILED DESCRIPTION OF THE INVENTION

This invention provides an improved organosiloxane composition that is curable to a clear thermally stable fluorosilicone gel, said composition comprising A. a liquid diorganovinylsiloxy terminated polydiorganosiloxane wherein at least 25 percent of the silicon atoms are bonded to a fluorine containing hydrocarbon radical;

B. a compatible liquid fluorine-containing organohydrogensiloxane having an average of more than two silicon bonded hydrogen atoms per molecule in an amount sufficient to provide a molar ratio of silicon bonded hydrogen atoms to vinyl radicals in said composition of from 0.5 to about 1.0; and C. an amount of a platinum-containing catalyst sufficient to promote curing of said composition.

The improvement comprises the presence in said composition of up to 0.1 percent, based on the weight of said composition, of copper acetylacetonate to minimize hardening and surface deformation of the cured gel at temperatures above 100° C.

1. The Heat Stabilizer

The novelty of the present curable compositions resides in the presence of copper acetylacetonate in an amount sufficient to suppress thermally induced hardening and surface deformation of gels prepared by curing the compositions of this invention, which encompass the compositions disclosed in the aforementioned Benditt and Maxson patent. Concentrations of up to 0.1 percent, based on the weight of the curable composition, of copper acetylacetonate are effective. The present inventors discovered that more than 0.1 weight percent of this ingredient will cause softening of the cured gel at temperatures above about 100° C. Less than 0.01 weight percent typically provides no significant reduction in hardening and surface deformation of the gel during heating.

The concentration of copper acetylacetonate in the present compositions is preferably from 0.01 to about 0.07 percent, based on the total weight of the curable composition. A concentration of at least 0.03 percent is particularly preferred.

The copper acetylacetonate is preferably used in combination with a non-reactive liquid triorganosiloxy-terminated poly(methyl-3,3,3-trifluoropropyl)siloxane to increase the adhesion, also referred to as "tack" of the cured gel. The presence of from about 10 to about 50 weight percent, based on the weight of diorganovinylsiloxy-terminated polydiorganosiloxane, of this non-reactive liquid fluorosilicone compound also increases the extent to which the cured gel softens, as evidenced by an increased penetration value, during long term exposure to temperatures above 100° C.

The present inventors discovered that this softening can be reduced by excluding from the curable composition the acetylenically unsaturated alcohols typically used as catalyst inhibitors in this type of organosiloxane composition.

2. The Vinyl-Terminated Polydiorganosiloxane

The vinyl-terminated polydiorganosiloxane, referred to hereinafter as Ingredient A, can be either a homopolymer or a copolymer and is conveniently represented by the general formula

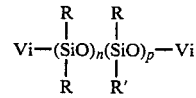

where R represents a monovalent hydrocarbon radical, R' represents the radical $RfCH_2CH_2$— where Rf represents a monovalent perfluorinated hydrocarbon radical containing from 1 to about 5 carbon atoms, Vi represents a vinyl radical, the sum of n and p typically represents a molecular weight equivalent to a viscosity of from $0.2 \times 10^{-3}$ to $0.01$ m²/sec. at 25° C. and the value of n can be from 0 to 3p.

The radical represented by R can contain from 1 to about 20 carbon atoms. A range of from 1 to 10 carbon atoms is preferred based on the availability of the corresponding cyclic diorganosiloxanes used to prepare ingredient A. Preferably R is methyl, phenyl or a combination of methyl and phenyl and R' is 3,3,3-trifluoropropyl. Most preferably all of the radicals represented by R are methyl and the value of n is 0.

Ingredient A is represented in the foregoing formula as a linear molecule. It will be understood, however, that in reality some of the molecules may contain branched units resulting from small amounts of trifunctional reactants present as impurities in the cyclic diorganosiloxanes used to prepare ingredient A.

Ingredient A can be a single polydiorganosiloxane species or a mixture containing two or more polydiorganosiloxanes of different molecular weights, so long as the viscosity of the mixture is within the aforementioned limits.

To reduce heat induced discoloration and hardening exhibited by prior art fluorosilicone gels cured by a hydrosilation reaction ingredient A is prepared using ammonia as the polymerization catalyst. The reason for this reduction in discoloration and hardening is not fully understood.

Methods for polymerizing cyclic diorganosiloxanes to liquid silanol terminated polydiorganosiloxanes using a variety of catalysts are sufficiently well described in the literature that a detailed description in this specification is not necessary. When ammonia is used as the catalyst, the polymerization reaction of the cyclic diorganosiloxane is typically conducted at temperatures of from 25° to about 100° C. until the desired molecular weight is achieved.

3. The Curing Agent (Ingredient B)

Ingredient A is cured by a hydrosilation reaction between the vinyl radicals of this ingredient and the silicon-bonded hydrogen atoms of the organohydrogensiloxane, referred to hereinafter as ingredient B. Ingredient B contains an average of more than two silicon bonded hydrogen atoms per molecule. It can contain an average of from 3 up to 20 or more silicon atoms per molecule and exhibits a viscosity of up to 10 Pa.s or higher at 25° C. Ingredient B contains repeating units of the formulae $HSiO_{1.5}$, $R''HSiO$ and/or $R''_2HSiO_{0.5}$. The molecules of ingredient B can also include one or more monoorganosiloxane, diorganosiloxane, triorganosiloxy and $SiO_2$ units that do not contain silicon bonded hydrogen atoms. In these formulae R" is a monovalent hydrocarbon radical containing from 1 to about 20 carbon atoms or a fluorinated hydrocarbon radical selected from the same group as the R' radical of ingredient A. Alternatively, ingredient B can be a cyclic compound containing diorganosiloxane and organohydrogensiloxane units or a compound of the formula Si(OSiR"₂H)₄.

To ensure compatibility between ingredients A and B, at least a portion of the radicals represented by R" should be identical to the majority of the hydrocarbon radicals present in ingredient A. When ingredient A is the preferred polydiorganosiloxane containing methyl-3,3,3-trifluoropropylsiloxane units, at least a portion of the R" radicals in ingredient B should represent 3,3,3-trifluoropropyl radicals. Most preferably ingredient B is a linear dimethylhydrogensiloxy terminated polyorganosiloxane containing from one to about three repeating units per molecule, all of which correspond to the general formula

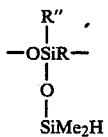

where R" represents 3,3,3-trifluoropropyl and Me represents methyl.

The molecular weights of ingredients A and B together with the number and distribution of the silicon-bonded hydrogen atoms in ingredient B will determine the location of crosslinks in the cured gel. The concentration of crosslinks per unit area is often referred to as the "crosslink density" and determines certain physical properties of the cured gel, particularly hardness and resiliency. The particular types and amounts of ingredients A and B yielding a desired combination of physical properties can readily be determined by routine experimentation with a knowledge of this invention.

The molar ratio of silicon bonded hydrogen atoms to vinyl or other ethylenically unsaturated hydrocarbon radicals present in the curable compositions of this invention is a major factor in determining the properties of the cured gel. As disclosed hereinbefore, a preferred type of organosiloxane gels is prepared from curable compositions containing a stoichiometric excess of vinyl radicals relative to silicon bonded hydrogen atoms. In the present compositions this ratio is typically from 0.3 to 1 silicon bonded hydrogen atom per vinyl radical, preferably from 0.5 to 0.9 silicon bonded hydrogen atom per vinyl radical.

The preferred ratio for a given composition will be determined at least in part by the average molecular weight of ingredient A and the type of organohydrogensiloxane curing agent.

4. The Platinum Containing Catalyst and Optional Inhibitor

Hydrosilation reactions are typically conducted in the presence of a catalyst that is a metal from the platinum group of the Periodic Table or a compound of such a metal. Platinum compounds such a hexachloroplatinic acid, and particularly complexes of these compounds with relatively low molecular weight, liquid vinyl-containing organosiloxane compounds, are preferred catalysts because of their high activity and compatibility with the organosiloxane reactants. These complexes are described in U.S. Pat. No. 3,419,593 that issued to David N. Willing on Dec. 31, 1968. Complexes wherein the silicon bonded hydrocarbon radicals are vinyl and either methyl or 3,3,3-trifluoropropyl are particularly preferred because of their ability to catalyze a rapid curing of the elastomer at temperatures of at least about 70° C. A particularly preferred catalyst of this type is the complex formed by reacting hexachloroplatinic acid with a liquid dimethylvinylsiloxy terminated poly(methyl-3,3,3-trifluoropropyl)siloxane.

The platinum containing catalyst can be present in an amount equivalent to as little as one part by weight of platinum per one million parts of curable composition. Catalyst concentrations equivalent to from 3 to 10 parts of platinum per million of curable composition are preferred to achieve a practical curing rate. Higher concentrations of platinum provide only marginal improvements in curing rate, and are therefore economically unattractive, particularly when the preferred catalysts are used.

Mixtures containing all of the foregoing reactants may begin to cure at room temperatures of about 25° C. To obtain a longer working time or "pot life" once all of the ingredients have been blended, the activity of the catalyst at room temperature can be retarded or suppressed by the addition of one of the known platinum catalyst inhibitors.

For reasons discussed in a preceding section of this specification the acetylenic compounds disclosed in U.S. Pat. No. 3,445,420, which issued on May 20, 1969 to Kookootsedes et al., should not be used in preferred embodiments of the present compositions because cured gels containing these inhibitors soften considerably in the presence of the non-reactive liquid triorganosiloxy-terminated poly(methyl-3,3,3-trifluoropropyl)siloxanes used to increase the adhesion of the cured gels.

An increase in the pot life of a curable composition can be achieved using an olefinically substituted siloxane of the type described in U.S. Pat. No. 3,989,667, which issued on Nov. 2, 1976 to Lee and Marko. Cyclic methylvinylsiloxanes are preferred.

4. Preparation of the Curable Compositions

The curable compositions of this invention can be prepared by blending together all of the ingredients at room temperature. Compositions containing one of the aforementioned platinum catalyst inhibitors can be stored at conventional room temperatures of about 25° C. for a few hours, or in some cases days, without curing to any substantial extent. When it is desired to store the curable composition for longer periods under ambient conditions it should be either refrigerated or packaged in at least two parts. The organohydrogensiloxane (ingredient B) and the platinum-containing catalyst are located in separate parts of the composition.

Part I of a two part composition will typically include a portion of the total amount of ingredient A, the liquid diorganosiloxy terminated polydiorganosiloxane, the platinum-containing catalyst and, optionally, an catalyst inhibitor that is other than an acetylenic alcohol when the optional non-reactive triorganosiloxy terminated polydiorganosiloxane is present to increase the adhesion of the cured gel.

Part II contains the remaining portion of ingredient A and the organohydrogensiloxane (ingredient B). The copper acetylacetonate is preferably present in this part of the composition.

Parts I and II each typically exhibit viscosities of from $0.5 \times 10^{-3}$ to $1.5 \times 10^{-3}$ m²/sec. at 25° C.

In accordance with a preferred method for preparing the present curable compositions substantially equal volumes of parts I and II are blended together.

Irrespective of the method by which the present compositions are prepared, they are cured by allowing all of the ingredients to react at ambient or elevated temperature. Compositions containing a catalyst inhibitor typically require heating to temperatures of 70° C. or above to achieve a fully cured state within a reasonable time interval, usually from several minutes to several hours.

The fluorine containing polysiloxane gels prepared by curing the present compositions are typically relatively soft, clear and colorless, and remain so following prolonged exposure to temperatures from 100° to about 150° C. The hardness of the gels can be expressed as the distance to which a probe of specified dimensions will penetrate the surface of the gel under a specified loading. The device typically used to measure this value is referred to as a penetrometer. A preferred class of cured gels prepared using the present compositions exhibit penetration values of from 2 to about 8 mm.

As discussed hereinabove the present gels are particularly suitable for coating or encapsulating solid state electronic devices and substrates on which these devices are mounted. Because the gels will not harden or discolor at temperatures of 100° C. and above and are not swollen and/or degraded by hydrocarbon fuels, devices coated with the present gels can be installed in the engine compartments of automobiles and other vehicles.

The following examples describe preferred curable compositions of this invention and demonstrate the resistance to hardening and surface deformation exhibited by cured gels prepared using the compositions of this invention containing copper acetylacetonate relative to fluorosilicone gels prepared using the same reactants in the absence of this additive.

The examples should not be interpreted as limiting the scope of the invention defined in the accompanying claims. All parts and percentages disclosed in the examples are by weight unless otherwise indicated and viscosities were measured at 25° C.

EXAMPLE 1

A curable composition was prepared by blending the following ingredients to homogeneity.

As ingredient A, 193 parts of a dimethylvinylsiloxy terminated poly(methyl-3,3,3-propyl)siloxane containing 1.3% of vinyl radicals and exhibiting a viscosity of $1.4 \times 10^{-3}$ m$^2$/sec. Ingredient A was prepared by the ammonia catalyzed polymerization of 2,4,6-trimethyl-2,4,6-tris(3,3,3-trifluoropropyl)cyclotrisiloxane followed by reaction of the resultant silanol terminated polydiorganosiloxane with sym-tetramethyldivinyldisilazane;

as ingredient B, 6.5 parts of an organohydrogensiloxane curing agent represented by the average formula

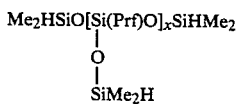

where Me represents a methyl radical, Prf represents a 3,3,3-trifluoropropyl radical, the average value of x is between 1 and 3, inclusive, and the silicon bonded hydrogen content is 0.6%;

as ingredient C, 0.15 part of a complex prepared by the reaction of hexachloroplatinic acid with a liquid dimethylvinylsiloxy terminated poly(methyl-3,3,3-trifluoropropyl)siloxane. Ingredient C contained 0.67% platinum; and 0.1%, based on the weight of the composition, of copper acetylacetonate.

For comparative purposes a curable composition containing the same types and amounts of ingredients but omitting the copper acetylacetonate was prepared. The molar ratio of silicon bonded hydrogen atoms to vinyl radicals in both compositions was 0.5.

A 100 gram portion of the two resultant mixtures were deaired under reduced pressure, poured into a wide mouth container and cured by heating it for one hour at 150° C. The cured gel layer was 2 cm. thick.

The penetration value of the gels was measured using a penetrometer manufactured by the Precision Scientific Company, catalog no. 73,510. The standard cones supplied with the instrument were replaced with a brass head measuring 6.350 mm. in diameter, 4.762 mm. in height and having a flat bottom and rounded edges. The total weight of the shaft and head was 19.5 grams.

The penetration value of the cured gel containing the copper acetylacetonate was 2.7 mm. and the penetration value for the control sample was 3.6 mm. The gel samples were then heated for 28 days in an oven maintained at a temperature of 175° C. At the end of this period the penetration value of the gel containing the copper acetylacetonate was 2.3 mm., a decrease of 15%. The control sample had hardened to the extent that the weighted probe of the penetrometer was not able to depress the surface of the cured gel, resulting in a reading of 0 mm. A visual examination of the surface of the two gels revealed a smooth surface on the gel containing copper acetylacetonate and a wrinkled surface on the control gel.

EXAMPLE 2

This example demonstrates the increase in adhesion or "tack" of gels prepared from compositions containing a non-reactive liquid trimethylsiloxy-terminated poly(methyl-3,3,3-trifluoropropyl)siloxane in addition to copper acetylacetonate and the need to exclude acetylenic alcohol type platinum catalyst inhibitors from this type of composition.

The penetration values for the cured gels were determined as described herein in the preceding Example 1. Ingredients A, B and C are described in Example 1, and ingredient C was present at a level of 0.02 parts in all samples. The liquid trimethylsiloxy-terminated dimethylsiloxane/3,3,3-trifluoropropylsiloxane copolymer (ingredient E) exhibited a viscosity of 0.3 Pa.s and was present at a concentration of 90 parts in all samples.

All of the gels were "tacky" to the touch after being stored for 1 month at a temperature of 175° C.

The amounts of ingredients A, B, and methylbutynol (F), a known platinum catalyst inhibitor, are listed in Table 1. The penetration values of the initial cured gel sample and the values obtained following heating at a temperature of 125° C. for 1 and 42 days are recorded in Table 2.

TABLE 1

| Sample No. | Ingredient (parts) | | |
|---|---|---|---|
| | A | B | F |
| 1 (Comparison) | 93.3 | 6.3 | 0.036 |
| 2 | 93.7 | 6.3 | 0 |
| 3 (Comparison) | 93.4 | 6.6 | 0.036 |
| 4 | 93.4 | 6.6 | 0 |

TABLE 2

| Sample No. | Penetration Values (@ 125° C.) | | |
|---|---|---|---|
| | Initial | 1 day | 42 days |
| 1 (comparison) | 119 | Bottom* | Bottom* |
| 2 | 70 | 70 | 74 |
| 3 (comparison) | 66 | ND | 81 |
| 4 | 42 | ND | 46 |

Bottom* = The penetrometer probe penetrated the gel layer and contacted the bottom of the container.
ND = Penetration value was not determined That which is claimed is:

1. In an organosiloxane composition curable to a clear, thermally stable fluorosilicone gel, said composition comprising
   A. a liquid diorganovinylsiloxy terminated polydiorganosiloxane wherein at least 25 percent of the silicon atoms are bonded to a fluorine containing hydrocarbon radical;
   B. a compatible liquid fluorine-containing organohydrogensiloxane having an average of more than two silicon bonded hydrogen atoms per molecule in an amount sufficient to provide a molar ratio of silicon bonded hydrogen atoms to vinyl radicals in said composition of from 0.5 to about 1.0; and
   C. an amount sufficient to promote curing of said composition of a platinum-containing catalyst, p1 the improvement comprising the presence in said composition of up to 0.1 percent, based on the weight of said composition, of copper acetylacetonate to minimize hardening and surface deformation of the cured gel at temperatures above 100° C.

2. A composition according to claim 1 where the concentration of copper acetylacetonate is from 0.01 to 0.1 percent, based on the weight of said composition, said polydiorganosiloxane exhibits the general formula

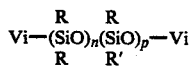

where R represents a monovalent hydrocarbon radical, R' represents a monovalent radical of the formula RfCH2CH2— where Rf represents a perfluorinated hydrocarbon radical containing from 1 to 5 carbon atoms, Vi represents a vinyl radical, the sum of n and p is equivalent to a molecular weight that is equivalent to a viscosity of from $0.2 \times 10^{-3}$ to 0.01 m.$^2$/sec. at 25° C., and the value of n is from 0 to 3p, the repeating units of said organohydrogensiloxane are of the formula

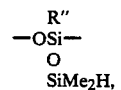

where R" represents 3,3,3-trifluoropropyl, and Me represents methyl.

3. A composition according to claim 2 where the concentration of copper acetylacetonate at least 0.03 percent, based on the weight of said composition, said diorganovinylsiloxy-terminated polydiorganosiloxane is prepared by the ammonia catalyzed polymerization of at least one cyclic polydiorganosiloxane, R contains from 1 to 10 carbon atoms, the value of n is from 0 to p, said composition contains an amount of a non-reactive liquid triorganosiloxy-terminated poly(methyl-3,3,3-trifluoropropyl)siloxane sufficient to increase the adhesion of said gel, and said composition is substantially free of acetylenic alcohol type catalyst inhibitors.

4. A composition according to claim 3 where R is methyl or phenyl, said cyclic polydiorganosiloxane is 2,4,6-trimethyl-2,4,6-tris(3,3,3-trifluoropropyl) cyclotrisiloxane, Rf is 3,3,3-trifluoropropyl, n is 0 and the platinum-containing catalyst is the reaction product of hexachloroplatinic acid and a liquid diorganovinylsiloxy terminated poly(methyl-3,3,3-trifluoropropyl)siloxane.

5. A composition according to claim 4 where the molar ratio of silicon-bonded hydrogen atoms to vinyl radicals in said composition is from 0.5 to 0.9, inclusive.

6. A composition according to claim 5 where said composition is packaged in two parts, with said platinum-containing catalyst and said organohydrogensiloxane being located in different parts of said composition.

7. A composition according to claim 6 where each of said parts contains a portion of said diorganovinylsiloxy-terminated polydiorganosiloxane and the copper acetylacetonate is packaged together with said organohydrogensiloxane.

* * * * *